(12) United States Patent
Koops et al.

(10) Patent No.: US 8,487,212 B2
(45) Date of Patent: *Jul. 16, 2013

(54) METHOD OF MARKING OR INSCRIBING A WORKPIECE

(75) Inventors: Arne Koops, Neu-Lankau (DE); Sven Reiter, Hamburg (DE); Bernd Lühmann, Norderstedt (DE)

(73) Assignee: tesa SE, Hamburg (DE)

( * ) Notice: Subject to any disclaimer, the term of this patent is extended or adjusted under 35 U.S.C. 154(b) by 790 days.

This patent is subject to a terminal disclaimer.

(21) Appl. No.: 12/607,272

(22) Filed: Oct. 28, 2009

(65) Prior Publication Data

US 2010/0133244 A1 Jun. 3, 2010

(30) Foreign Application Priority Data

Dec. 1, 2008 (DE) .................. 10 2008 059 756

(51) Int. Cl.
*B23K 26/00* (2006.01)

(52) U.S. Cl.
USPC ............. 219/121.84; 219/121.68; 219/121.69

(58) Field of Classification Search
USPC .................... 219/121.68, 121.69, 121.84
See application file for complete search history.

(56) References Cited

U.S. PATENT DOCUMENTS

| | | | |
|---|---|---|---|
| 3,533,897 A * | 10/1970 | Robbins, Jr. et al. | 428/142 |
| 4,014,030 A * | 3/1977 | Stark et al. | 347/131 |
| 4,417,790 A * | 11/1983 | Dawson et al. | 351/159.57 |
| 4,679,918 A * | 7/1987 | Ace | 351/159.62 |
| 5,171,650 A | 12/1992 | Ellis et al. | |
| 5,198,922 A * | 3/1993 | Chahroudi | 359/290 |
| 5,987,920 A | 11/1999 | Bosman et al. | |
| 6,160,835 A * | 12/2000 | Kwon | 372/108 |
| 6,337,119 B1 * | 1/2002 | Shipman | 428/64.2 |
| 6,579,655 B1 * | 6/2003 | Shimomura et al. | 430/200 |
| 6,699,634 B2 * | 3/2004 | Yamamoto | 430/200 |

(Continued)

FOREIGN PATENT DOCUMENTS

| | | |
|---|---|---|
| DE | 696 07 336 T2 | 11/2000 |
| DE | 10 130 349 A1 | 1/2003 |
| EP | 1 431 057 A1 | 6/2004 |

OTHER PUBLICATIONS

European Search Report dated Mar. 24, 2010.

(Continued)

*Primary Examiner* — Jarrett Stark

(74) *Attorney, Agent, or Firm* — Norris McLaughlin & Marcus, P.A.

(57) ABSTRACT

The present invention provides a method of and apparatus for marking or inscribing a workpiece (3) with high-energy radiation, more particularly with a laser beam (1), the workpiece (3) having a light-scattering surface (9) and the material of the workpiece (3) being transparent for the radiation wavelength, and a polymer matrix (7) being disposed on the workpiece (3) in such a way that the radiation passes through the workpiece (3) and its light-scattering surface (9) before impinging on the polymer matrix (7), characterized in that the light-scattering surface (9) of the workpiece (3) is wetted with a liquid or viscoelastic medium (11).

7 Claims, 1 Drawing Sheet

U.S. PATENT DOCUMENTS

| | | | |
|---|---|---|---|
| 7,090,959 B2 * | 8/2006 | Shimomura et al. | 430/200 |
| 7,837,823 B2 * | 11/2010 | Griffin et al. | 156/277 |
| 8,026,021 B2 * | 9/2011 | Stumpe et al. | 430/1 |
| 2002/0046994 A1 * | 4/2002 | Miesak | 219/121.69 |
| 2003/0127441 A1 | 7/2003 | Haight et al. | |
| 2008/0030675 A1 * | 2/2008 | Dillon | 351/159 |
| 2008/0037135 A1 * | 2/2008 | Lai | 359/653 |
| 2009/0086154 A1 * | 4/2009 | Dillon | 351/44 |
| 2009/0097808 A1 * | 4/2009 | Wolfe et al. | 385/125 |
| 2009/0107964 A1 * | 4/2009 | Haight et al. | 219/121.68 |
| 2010/0133245 A1 * | 6/2010 | Koops et al. | 219/121.69 |

OTHER PUBLICATIONS

S.I. Blokhina et al., "Use of the YuS-76 Equipment for Studying the Quality of Flat Glass" Glass and ceramics, Bd. 39, Nr. 1, Jan. 1982.

German Search Report, Deutsches Patent- und Markenamt, dated Jul. 8, 2009.

* cited by examiner

METHOD OF MARKING OR INSCRIBING A WORKPIECE

BACKGROUND OF THE INVENTION (1) Field of the Invention

The present invention relates to a method of and apparatus for marking or inscribing a workpiece with high-energy radiation, more particularly with a laser beam, the workpiece having a light-scattering surface and the material of the workpiece being transparent for the radiation wavelength, and a polymer matrix being disposed on the workpiece in such a way that the radiation passes through the workpiece and its light-scattering surface before impinging on the polymer matrix.

(2) Description of Related Art

It is known that the use of laser radiation for machining material of a workpiece is based fundamentally on the absorption of the radiation and on an energy conversion with subsequent processes such as vaporization, ionization, particulate removal and photochemical events. These processes may take place in the workpiece itself, with the result that markings or inscriptions are produced in the form, for example, of an engraving, or another material is deposited locally on the workpiece, as part, for example, of laser beam vaporization (pulsed laser deposition, PLD). Variants of pulsed laser deposition take place in particular in the case of workpieces whose material is transparent for the wavelength of the laser radiation that is used.

The optical properties of a material may be described by the degree of transmission T, the degree of reflection R and the degree of absorption A, which are considered to be functions of the wavelength. The laser beam typically passes through the air medium to the site of machining, where it impinges on the surface of a workpiece. It is known that the laser energy is coupled only to a particular extent into a workpiece. These losses come about primarily through reflection and scattering of the laser radiation at the surface of the workpiece to the machined. As a result of this, only part of the laser beam is provided for the desired operation or, respectively, is coupled out again through scattering or is diverted into unwanted regions of the workpiece.

Particularly materials having metallic properties possess a high degree of reflection over a large wavelength range, which makes machining more difficult and means that operating variables such as power, wavelength, pulse length and duration of exposure must be set with appropriate accuracy in order to allow the machining of a workpiece having metallic properties.

In considering the optical properties, a distinction is made between the behaviour at the interface between two media and the behaviour within the medium. At a planar interface between two media, the laser light may be transmitted and/or reflected. In the medium itself, there may be absorption or there may be complete transmission, if the workpiece, for example, is a glass substrate which does not absorb the wavelength of the light.

If, however, there are interfaces in a microscopic structure in which these act like a converging lens or diffusing lens, the laser light may undergo a change in its path. Surfaces with a roughness in the micrometer range likewise give rise to not inconsiderable diffuse reflections.

Overall, these optical phenomena interfere with the coupling of light into the material and may therefore considerably impair the machining outcome. Highly reflective materials in particular, with high machining thresholds, can be machined only using extremely powerful lasers. In addition, however, materials which the laser passes through, such as optical lenses, for instance, alter the quality of the laser beam and then lead to poor results in the course of further use.

In the case of a workpiece made of glass, it is common to use anti-reflection coatings in order to reduce reflection of visible wavelengths; such coatings find use in architecture, on sheets of glass, but also on spectacle lenses.

It is common knowledge that rough surfaces reflect the light in all directions. A surface is described as being optically smooth if the roughnesses are significantly smaller than the wavelength $\lambda$ of the incident light. If, however, the roughness is greater than the wavelength $\lambda$, the surface is referred to as optically rough. For example, a glass with an optically rough surface appears to be opaque, despite the fact that, on the basis of its other optical properties, the glass would be transparent.

Since, for the machining of glass by means of laser radiation, as little laser radiation as possible ought to be transmitted by the glass, glass is frequently machined with a $CO_2$ laser, since glass is not translucent for infra-red wavelengths around 10.6 μm. Consequently, the laser radiation is absorbed in the glass and leads to the coupling-in of radiative energy and hence to the heating of the workpiece. This means that the wavelength of 10.6 μm is used for glass in machining operations such as cutting and drilling.

Where a solid-state laser having a wavelength of 1064 nm is used, glass does indeed possess an extremely low degree of absorption, and so this laser radiation in principle passes through the glass without structural effect on the glass. If, however, a glass having an optically rough surface is employed, then a not inconsiderable part of the laser beam is refracted at the rough interface, and only a certain proportion penetrates the glass substrate and passes through it. Moreover, it is possible to employ glasses which possess a microstructure in order to trap or divert high-energy light.

In the case of solar cells in particular, glass structures are used as solar cell covers which allow an improvement in the coupling-in of light. This technique is referred to as "light trapping", since the incident photons may be returned by reflection via the structure up to eight times and may therefore be, as it were, "trapped". Looking at the structure more closely, according to geometrical optics, it is a system of concave and convex lenses which act as a diffusing or converging lens. In addition, however, microparticles or nanoparticles are applied to the surface which diffusely reflect the incident light.

At each point of impingement of the light on an optically rough surface of this kind, the law of reflection applies. This is also true of the laser light wavelength of 1064 nm, and so the parallel laser beam is refracted in an uncontrolled way. If, then, a workpiece having an optically rough surface of this kind is to be inscribed using a laser beam having a wavelength of 1064 nm, it is necessary to use higher laser powers in comparison to a workpiece having optically smooth surfaces; this first makes the method less efficient, and second may have harmful effects on the workpiece, as a result of the coupling-in of heat.

It is an object of the present invention, therefore, to provide a method of and apparatus for marking or inscribing a workpiece with high-energy radiation, more particularly with a laser beam, in which the coupling-in of laser light via a light-scattering, rough surface is more efficient.

BRIEF SUMMARY OF THE INVENTION

This object is achieved by a method of the invention and apparatus of the invention according to claims 1 and 9 respectively. Advantageous embodiments are subject matter of the dependent claims.

The present invention firstly provides a method of marking or inscribing a workpiece with high-energy radiation, more particularly with a laser beam. The workpiece in this case has a light-scattering surface and the material of the workpiece is transparent for the radiation wavelength. A polymer matrix, moreover, is disposed on the workpiece in such a way that the radiation passes through the workpiece and its light-scattering surface before impinging on the polymer matrix. The method is characterized in that the light-scattering surface of the workpiece is wetted with a liquid or viscoelastic medium.

A polymer matrix for the present purposes is any matrix based on polymeric constituents. In addition to the polymeric constituents, the matrix may also comprise any desired non-polymeric constituents; only the main constituent ought to be polymeric in nature. In particular the term "polymer matrix" also refers to a mixture of base polymers. In a particularly preferred embodiment, the polymer matrix is a thermoset polymer matrix. It has emerged that thermosets in particular are particularly suitable for marking or inscribing a workpiece.

As a result of the wetting of the light-scattering surface of the workpiece with a liquid or viscoelastic medium, the structure of the light-scattering surface is filled up, and so the light-scattering, rough surface becomes optically smooth. As a result of this the reflection and scattering characteristics of the surface are altered in such a way that the laser beam is able to pass through the workpiece without disruptive total reflection and with a considerably reduced degree of reflection. The viscoelastic medium may be, for example, an adhesive having an elastic film carrier, it being possible for the elastic film carrier to constitute the polymer matrix.

In order to minimize reflection at the interfaces between workpiece and the medium, it is advantageous if the liquid or viscoelastic medium has a refractive index similar to that of the material of the workpiece.

The radiation source used is preferably a laser which is suitable for marking, inscribing or engraving of workpieces. This is, for example, a fibre-coupled solid-state diode laser such as, for instance, a FAYb fibre laser (fibre-amplified ytterbium) having a wavelength of 1064 nm and an average power of 12 to 15 W. Since, therefore, radiation in the wavelength range of 600 nm-1500 nm is used, it is advantageous if the liquid or viscoelastic medium in the wavelength range of 600 nm-1500 nm exhibits no absorption or has a degree of absorption of less than 10%. The same applies to the material of the workpiece, which is preferably a glass substrate.

The light-scattering surface ought advantageously to be wetted with an extremely thin layer of the liquid or viscoelastic medium, which is just sufficient to provide optical smoothing of the light-scattering, rough surface. Since, however, there may be evaporation and vaporization of the medium, it is necessary to ensure that the light-scattering surface is wetted sufficiently in the course of irradiation. It has emerged that this is the case, depending on the application and the roughness of the surface, for layer thicknesses of the liquid or viscoelastic medium of 250 nm-10 mm. It may also be advantageous to wet the light-scattering surface two or more times or to carry out continuous wetting.

In one preferred embodiment of the method the polymer matrix is disposed in contact with a surface of the workpiece which is opposite the light-scattering surface. The radiation passing through the wetted surface and the workpiece may then induce removal of material from the adjacent polymer matrix, thereby allowing constituents of the polymer matrix or resultant products to be deposited in the form of a marking or inscription on the workpiece. For the marking or inscription it is preferred that products are deposited which are products of a chemical reaction of reactants which are provided by the polymer matrix and made available for the reaction by the removal of material that is induced by the radiation. The further radiation may then also be used to promote or set in train the chemical reaction.

The polymer matrix may have, for example, a titanium donor and also a carbon donor. A useful titanium donor is pure titanium or a titanium compound which has an affinity for providing free titanium as a reactant within a short time on exposure to energy. Where appropriate, the free titanium may also be provided via the pathway of a titanium-containing intermediate. The carbon donor provides free carbon, in particular, under irradiation with energy. The carbon donor may be a carbon compound and/or free, unbonded carbon. The carbon donor may be provided by the polymer matrix itself, or else an additional carbon component may be present, in the form of carbon black, for example. Moreover, the polymer matrix may also comprise further components such as polymers, absorbers, etc., for example. As a result of the radiation, the titanium and carbon reactants are provided—for example, by disruption of a titanium compound and of a carbon compound—and, on exposure to further radiation, the desired titanium carbide product is formed. At a local temperature of 1700° C. to 2200° C., preferably, titanium dioxide is reduced with carbon black or ultra-pure graphite to titanium carbide and carbon monoxide. It is the radiation which produces the temperature which is necessary for the reaction.

The polymer matrix is formed such that it responds to laser irradiation predominantly by pulverization, thereby releasing the individual reactants, more particularly titanium and carbon, and making them available for the reaction to titanium carbide. The titanium carbide deposited on the workpiece, which is not transparent in the visible wavelength range, then serves as a marking or inscription on the workpiece.

After the marking or inscribing it is preferred to remove the liquid or viscoelastic medium from the light-scattering surface again, since the optical smoothing of the light-scattering, rough surface may not be desirable for subsequent uses of the workpiece. For example, glass surfaces of solar cell covers may be deliberately structured or roughened for improved light coupling.

The invention secondly provides an apparatus for marking or inscribing a workpiece with a laser beam, the apparatus having a laser beam source and a holder for a workpiece, the holder being designed to hold a workpiece, which has a light-scattering surface whose material is transparent for the wavelength of the laser beam and is in contact with a polymer matrix, in the path of the laser beam in such a way that the radiation passes through the workpiece and its light-scattering surface before impinging on the polymer matrix, characterized in that the apparatus additionally has a dispenser unit which is designed to wet the light-scattering surface of the material with a liquid or viscoelastic medium.

The dispenser unit which is designed to wet the light-scattering surface of the material with a liquid or viscoelastic medium may therefore ensure that the light-scattering surface is sufficiently wetted in the course of marking or inscribing.

The apparatus preferably also has a remover unit, such as a wiper, a dryer or suction means, in order to remove the liquid or viscoelastic medium from the light-scattering surface of the material again.

In the text below, an advantageous embodiment of the method of the invention is elucidated in more detail with reference to the attached figures.

BRIEF DESCRIPTION OF THE SEVERAL
VIEWS OF THE DRAWING(S)

DETAILED DESCRIPTION OF THE INVENTION

Figure 1:
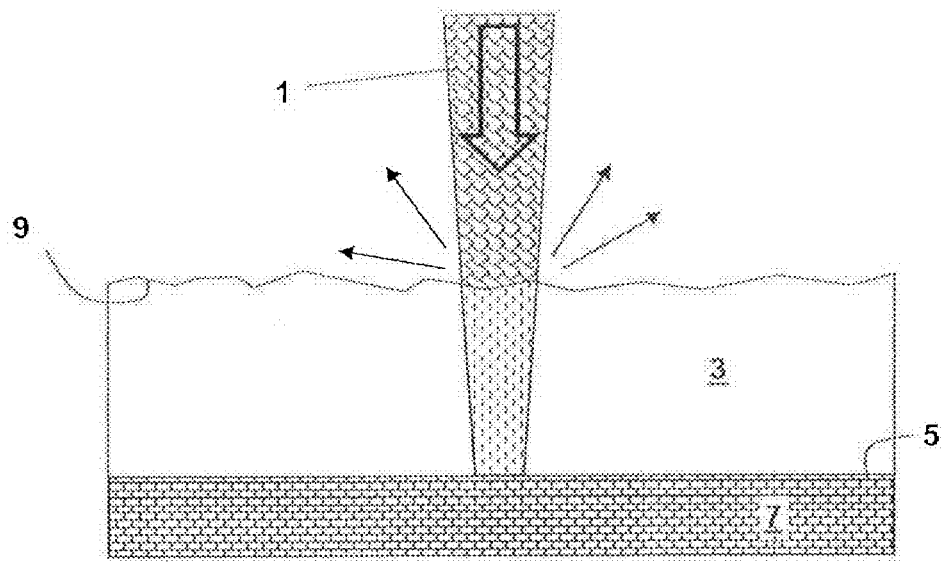
FIG. 1 shows the diffuse reflection of a laser beam on a light-scattering, rough surface of a workpiece.

FIG. 1 shows how a laser beam 1 is directed onto a workpiece 3 which is to be marked or inscribed on a surface 5. Disposed on the surface 5 of the workpiece 3 is a polymer matrix 7 which is in contact with the surface 5. The workpiece 3 is transparent for the wavelength of the laser beam 1, whereas the polymer matrix 7 primarily absorbs the laser beam 1. The laser beam 1 enters the workpiece 3 via a rough, light-scattering surface 9 of the workpiece 3, which is opposite the surface 5 to be marked, and passes through the workpiece 3 and impinges on the polymer matrix 7, which absorbs the laser beam 1. A not inconsiderable fraction of the laser beam 1, however, is not transmitted by the rough, light-scattering surface 9 of the workpiece 3, but is instead returned as diffuse reflection, as indicated in FIG. 1 by the radial arrows. As a result, therefore, only part of the laser beam 1 reaches the polymer matrix 7. The power density of the laser beam 1 may in this way be reduced within the workpiece 3 to such an extent that it is not possible to obtain a sufficient transfer of energy to the polymer matrix 7 for marking or inscribing. In that case it is not possible for pulverization or depolymerization to take place in the polymer matrix 7, and therefore no constituents of the polymer matrix or resultant products can be deposited as a marking or inscription on the surface 5 of the workpiece 3. In this case it would be necessary to increase the power of the laser, which would make the method less efficient and would cause unnecessarily and even, possibly, damagingly greater heating of the workpiece.

Figure 2:
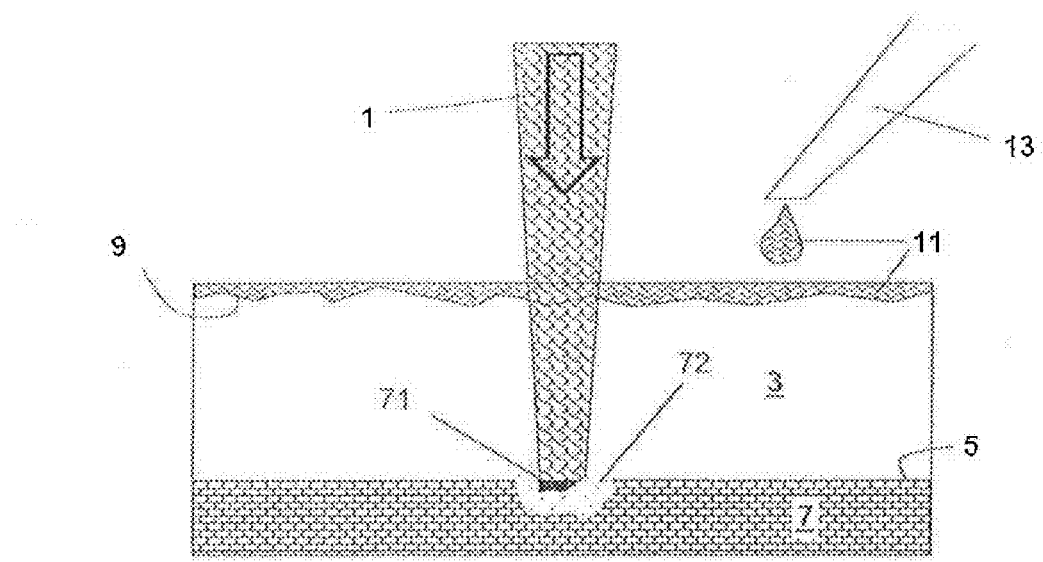
FIG. 2 illustrates the reduction in the diffuse reflection by wetting of the light-scattering, rough surface.

FIG. 2 shows the effect of a liquid 11, such as water, for example, that wets the rough, light-scattering surface 9 of the workpiece 3. With a dispenser unit 13 in the form of a spout, pipette or other liquid port, the liquid 11 is applied, before or in the course of marking or inscribing, to the rough, light-scattering surface 9. The surface 9 is therefore optically smoothed, since the refractive index of the liquid 11 is similar to that of the material of the workpiece 3, which is a glass substrate. In this case there are no diffuse reflections at the boundary layer between workpiece 3 and liquid 11.

Consequently a larger proportion of the laser beam 1 is coupled into the workpiece 3, and so the method is more efficient and, even without increasing the laser power, it is possible to obtain a sufficient transfer of energy to the polymer matrix 7 for marking or inscribing. In this case, indeed, the exposure to the laser beam 1 produces local pulverization and depolymerization 72 in the polymer matrix 7, with constituents of the polymer matrix or products formed therefrom being deposited in the form of a marking or inscription 71 on the surface 5 of the workpiece 3.

The invention claimed is:

1. A method of marking or inscribing a workpiece (3) comprising the steps of
    providing high-energy radiation (1),
    providing the workpiece (3) having a light-scattering surface (9) and made of a transparent material for the radiation wavelength, and having a polymer matrix (7) being disposing on the workpiece (3) in such a way that the radiation passes through the workpiece (3) and its light-scattering surface (9) before impinging on the polymer matrix (7),
    wetting the light-scattering surface (9) of the workpiece (3) with a liquid or visco-elastic medium (11), and
    wherein the radiation induces removal of material from the polymer matrix (7), and resultant products deposit on the workpiece (3) in the form of a marking or inscription, and
    wherein the liquid or viscoelastic medium (11) is removed from the light-scattering surface (9) after the marking or inscribing.

2. The method according to claim 1, further providing the liquid or viscoelastic medium (11) with a refractive index similar to that of the material of the workpiece (3).

3. The method according to claim 1, wherein the liquid or viscoelastic medium (11) in the wavelength range of 600 nm-1500 nm exhibits no absorption or has a degree of absorption of less than 10%, and using radiation in the wavelength range of 600 nm to 1500 nm.

4. The method according to claim 1, wherein the light-scattering surface (9) is wetted with a 250 nm to 10 mm layer of the liquid or viscoelastic medium (11).

5. The method according to claim 1, wherein the material of the workpiece (3) is a glass substrate which in the wavelength range of 600 nm to 1500 nm exhibits no absorption or has a degree of absorption of less than 10%, and using radiation in the wavelength range of 600 nm to 1500 nm.

6. The method according to claim 1, wherein the polymer matrix (7) is disposed in contact with a surface (5) of the workpiece (3) which is opposite the light-scattering surface (9).

7. The method of claim 1, wherein the high-energy radiation originates from a laser beam.

\* \* \* \* \*